Figure 1:
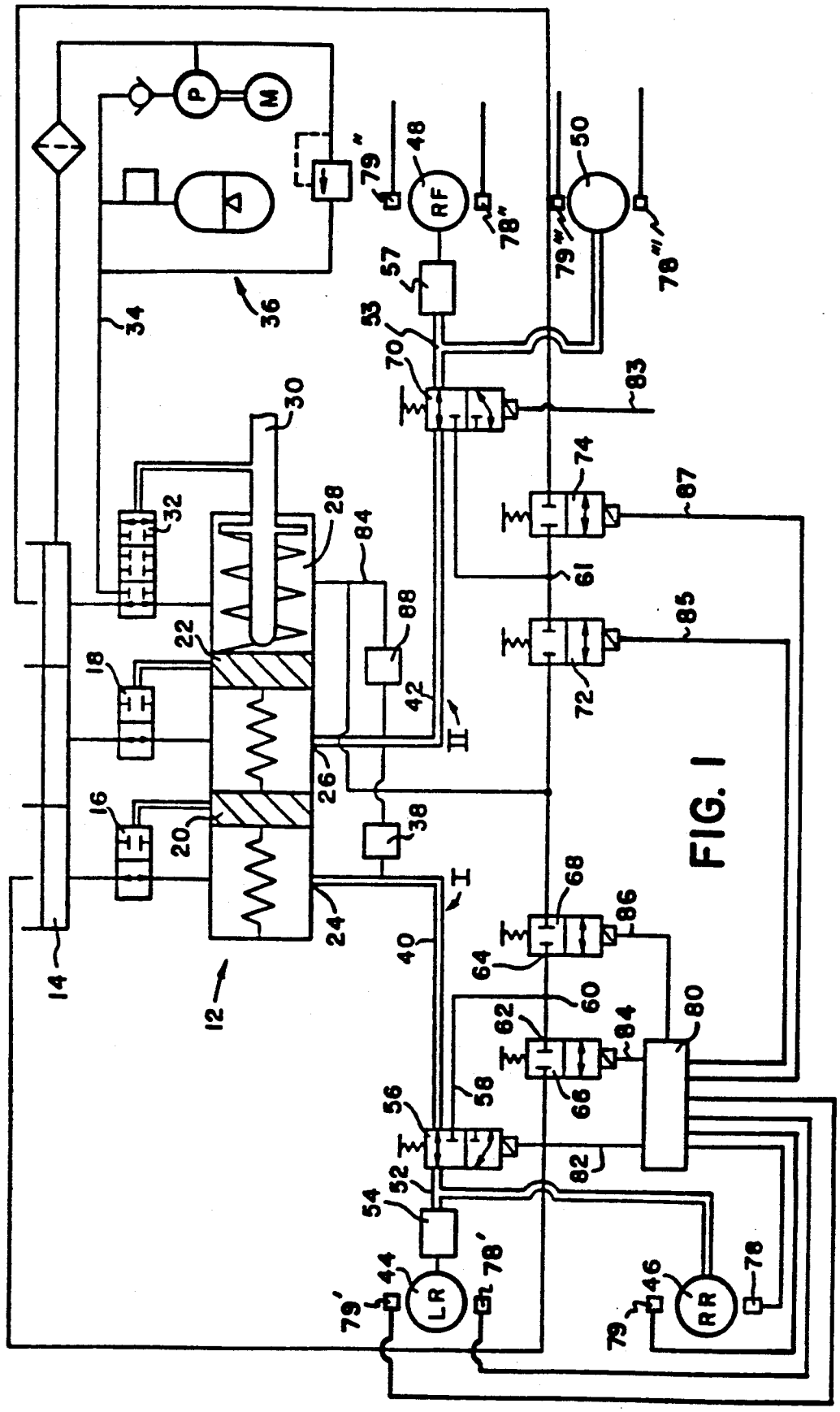

United States Patent [19]

Tsang et al.

[11] Patent Number: 5,108,159
[45] Date of Patent: Apr. 28, 1992

[54] NOISE ATTENUATED ANTI-LOCK BRAKE SYSTEM

[75] Inventors: Peter H. Tsang, Union Lake; Seong K. Rhee, Northville; Theodore F. Schnitz, Detroit, all of Mich.; Yiren S. Wang, Sidney, Ohio

[73] Assignee: Allied-Signal Inc., Morristown, N.J.

[21] Appl. No.: 603,358

[22] Filed: Oct. 26, 1990

[51] Int. Cl.⁵ .............................................. B60T 8/58
[52] U.S. Cl. ...................................... 303/100; 303/110
[58] Field of Search ............... 303/100, 110, 93, 113, 303/107, 113 R

[56] References Cited
U.S. PATENT DOCUMENTS 4,039,227 8/1977 Sivulka ............................ 303/107
4,718,737 1/1988 Bach et al. ...................... 303/110
4,743,074 5/1988 Inoue ............................... 303/110
4,758,054 7/1988 Brown ......................... 303/110 X
4,819,994 4/1989 Holroyd ........................... 303/100

Primary Examiner—Matthew C. Graham
Attorney, Agent, or Firm—Leo H. McCormick, Jr.; Ken C. Decker

[57] ABSTRACT

A noise sensor for supplying a central processing unit of an anti-lock brake system with a noise signal corresponding to vibrations produced during braking. The central processing unit responds to the noise signal by supplying a control valve assembly with an operational signal which modulates the fluid pressure supplied to a wheel cylinder to create a predetermined fluid pressure frequency therein to nullify vibrations and correspondingly attenuate noise produced thereby.

5 Claims, 2 Drawing Sheets

FIG. I

NOISE ATTENUATED ANTI-LOCK BRAKE SYSTEM

This invention relates to an anti-lock braking system with vibration sensing means that supplies a central processing unit in the anti-lock braking system with a vibration signal to create an operational signal to modulate fluid pressure supplied to operate wheel cylinders and correspondingly attenuate the development of noise during a brake application.

During a brake application, the rubbing of a friction pad on a rotor can produce noise or squeal. Many attempts have been made to reduce the creation of such noise including the application of coatings to the back of a backing plate, special design of a brake pad surface, adding special ingredients to the formula of the friction pad, and noise barriers between the friction pad and backing plate. Under certain circumstances some or all of these methods of noise abatement have worked but certain operating conditions such as low temperature and low operating brake pressures have resulted in the creation of certain brake noise.

Anti-lock braking systems have continued to gain acceptance by most automobile manufactures because of the control that a driver maintains over a vehicle when operating under adverse conditions. In most anti-lock braking systems, a central processing unit receives an input signal from a wheel speed condition sensor to modulate the fluid pressure supplied to a wheel cylinder during a brake application and prevent wheel lock up. In order to modulate the fluid pressure it is common practice to have a plurality of build and decay solenoid valves in the braking system to control the supply of fluid to the individual wheel cylinders. During a brake application, a first solenoid valve isolates each wheel cylinder from the source of brake pressure such as a master cylinder or hydraulic booster, a second solenoid valve in response to an operational signal from the central processing unit allows brake pressure supplied to a wheel cylinder to be reduced or decayed and a third solenoid also responsive to the central processing unit allows fluid pressure from a second source such as a motor-driven pump or booster to increase the brake pressure supplied to the wheel cylinder. This system adequately performs to control the braking in a safe and effective manner, however, under some circumstances such as during low deceleration stops where the input from the wheel speed condition sensor indicates that normal braking is adequate to bring a vehicle to a safe stop, noise can still occur during such a stop. Noise or brake squeal is undesirable to most operators of a vehicle.

We have devised a brake system which utilizes vibration sensors associated with each wheel brake to provide a central processing unit with an operational signal corresponding to vibration produced during a brake application. The central processing unit reacts to the operational signal corresponding to vibration by providing the first, second and third solenoids of the anti-lock system with an input to modulate the fluid pressure provided to create a predetermined frequency in the fluid pressure to nullify or modify the vibrations and thereby substantially reduce the creation of noise during a brake application. A switch connected to receive a signal corresponding to the wheel speed conditions which indicate a need for the activation of the anti-lock system also receives the vibration signal prior to its presentation to the central processing unit. The switch responds to the wheel speed condition signal to override the vibration signal to give the anti-lock preference over the noise signal such the optimum braking of the vehicle is not compromised.

It is an object of this invention to provide a brake system for a vehicle equipped with an anti-lock braking system with sensor means responsive to vibrations created during a brake application to provide a central processing unit with a noise input signal and in the absence of a wheel speed condition that would indicate the need for actuation of the anti-lock brake system said central processing unit modulating the brake fluid pressure to create a predetermined frequency to modify or nullify the vibration and correspondingly the generation of noise during the brake application.

It is another object of this invention to provide a brake system with means to attenuate the creation of noise during a brake application by nullifying the effects of vibration by supplying wheel cylinders with fluid having a predetermine frequency.

It is a further object of this invention to provide a brake system with an anti-lock braking system with vibration sensors that activate a central processing unit in the absence of a wheel speed condition to create a signal through which the brake fluid supplied to the wheel cylinders is modulated to nullify the vibrations and correspondingly any noise created during a brake application.

Figure 2:
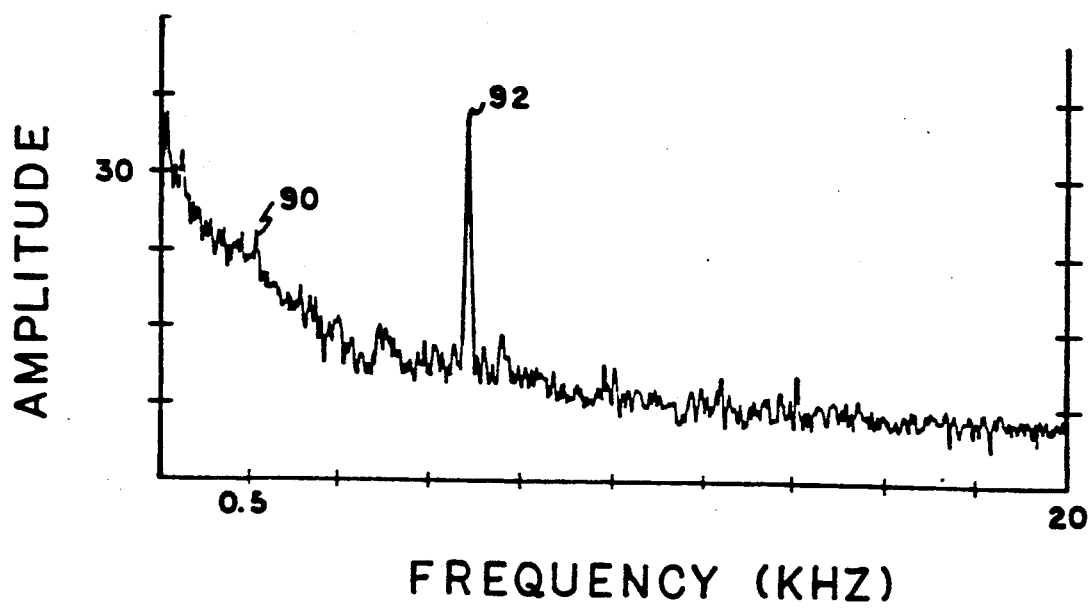
Figure 3:
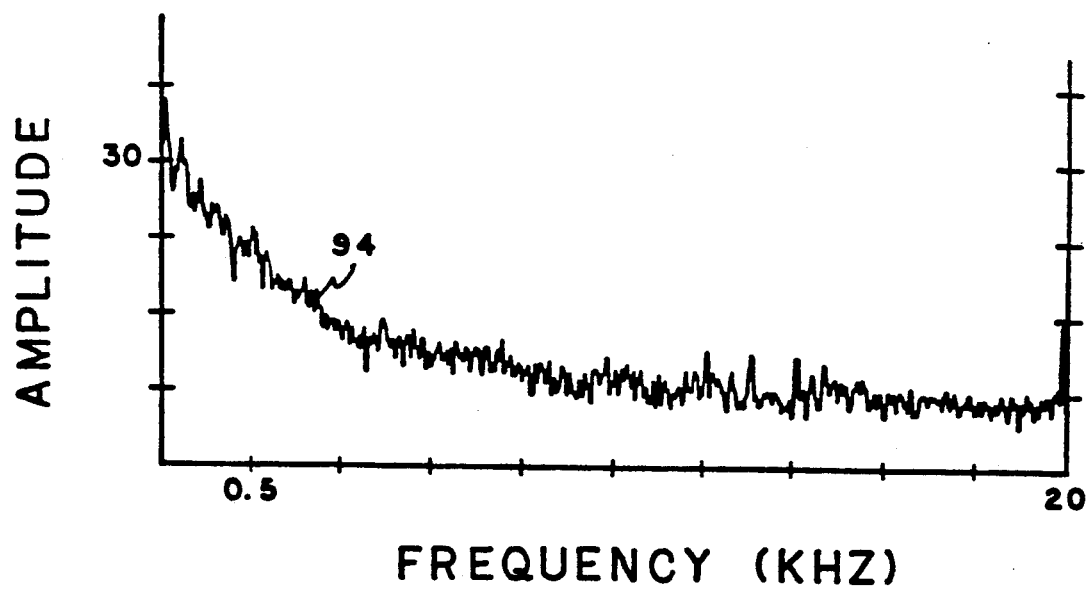

These objects and advantages arising from the brake system disclosed should be apparent from reading this specification while viewing the drawings wherein:

FIG. 1 is a schematic illustration of a braking system having an anti-lock brake system with noise attenuating means as disclosed by this invention; and FIG. 2 is a graph illustrating noise generated during a brake application in the brake system without the operation of the present invention; and FIG. 3 is a graph illustrating noise generated during a brake application in the brake system with the invention in operation.

FIG. 1 illustrated a typical a two channel braking system of the type fully disclosed in U.S. Pat. No. 4,758,054 which includes a dual circuit master cylinder 12 that receives braking fluid from a reservoir 14 through a pair offshut off valves 16 and 18. The dual circuit master cylinder 12 has two pistons 20 and 22 that are moved to produce pressurized brake fluid in the master cylinder which is supplied to output ports 24 and 26 in response to pressurized braking fluid being supplied to boost chamber 28. The fluid in chamber 28 in turn is manually modulated by means of an actuating rod 30 which mechanically modulates a hydraulic control valve 32 in response to an operator input applied to a brake pedal. Valve 32 is connected to receive pressurized braking fluid by a conduit 34 from motor driven pump and accumulator assembly 36. Output port 24 is connected to a first channel I which supplies two of the wheel brakes on the vehicle with pressurized fluid during a brake application and output port 26 is connected to a second channel II which supplies the other two the wheel brakes with pressurized fluid during a brake application. Failure in either of the braking channels I or II is detected by a pressure differential switch 38 connected between output conduits 40 and 42. Should there be a failure in either the boost chamber 28 or the motor driven pump and accumulator assembly 36, pistons 20 and 22 are mechanically actuated by movement of control rod 30.

In the illustrated embodiment, it will be seen that the four wheel brake cylinders 44, 46, 48 and 50 are connected in a cross-split configuration with one front and an oppositely disposed rear-wheel cylinder located in each of the channels I and II. A proportioning valve 54 is located in channel I between tee joint 52 and the left rear cylinder 44 to balance or proportion fluid pressure in conduit 40 between front and rear cylinders 44 and 46. Similarly, proportioning valve 57 is located in channel II between tee joint 53 and the right rear cylinder 48 to balance or proportion fluid pressure in conduit 42 between front and rear cylinders 48 and 50. Tee joint 52 is coupled through a 3 way isolation valve 56 to the conduit 40 through its normally open circuit. The normally closed circuit of isolation valve 56 extends between the conduit 52 and an output conduit 58. Conduit 58, in turn, is connected to a common joint 60 connected to receive inputs 62 and 64 from normally closed 2-way valves 66 and 68.

Valve 66 connects joint 60 to the reservoir 14 and valve 68 connects joint 60 to chamber 28 to provide for decay and build of fluid pressure in channel I and in accordance with inputs from the central processing unit 80.

Similarly, a 3 way isolation valve 70, build valve 72 and decay valve 74 are identically connected in control channel II to a common joint 61, the reservoir 14 and the central processing unit 80 to control the supply of pressurized fluid to wheel cylinders 48 and 50 associated with the right rear and left front wheels of the vehicle, respectively.

In addition to the wheel speed sensors 78, 78', 78" and 78'" associated with each of the wheels of the vehicle which supply inputs to the central processing unit 80, vibration sensors 79, 79', 79" and 79'" are also associated with each of the wheels of the vehicle and supply the central processing unit 80 with input signals indicative of vibrations created during braking.

In operation, during normal braking, valve 56 is in its normal state whereby wheel cylinders 44, 46 are operated in conventional fashion from fluid pressure created through the movement of piston 20 in master cylinder 12. In the event that the anti-lock control system senses an incipient wheel lock condition by means of a wheel sensor 78 and central processing unit 80, the central processing unit 80 will output control signals via output lines 82, 84 and 86 to operate the solenoid actuators of the valves 56, 66, and 68, respectively. Initially, isolation valve 56 is actuated thereby interrupting fluid communication of the output from piston 20 in master cylinder 12 and wheel cylinders 44 and 46. Simultaneously, 3 way isolation valve 56 connects the wheel cylinders 44 and 46 to joint 60 by conduits 58. Joint 60 is connected to reservoir 14 through valve 66 and to boost chamber 28 through the valve 68 by conduit 84. Depending on the signal supplied to valves 56, 66, and 68 channel I may be connected to either fluid pressure source in boost chamber 28 or to the reservoir 14 to decay and building of the brake pressure supplied to the wheel cylinders 44 and 46 in accordance with well known anti-lock brake systems. Valves 70, 72 and 74 which are connected to the central processing unit 80 by output lines 83, 85, and 87 respond in an identical manner to control the supply of fluid pressure in channel II to wheel cylinders 48 and 50. Typically, a pressure differential switch 88 is also provided in the brake system 10 to sense a failure of boost pressure to deactivate the anti-lock system and thereafter convert the brake system 10 to manual operation. The system in FIG. 1 can be applied to any two channel anti-lock system whether of the cross-split type as shown, or conventional front rear split.

Under some circumstances during a brake application, noise occurs as a result of vibration that is produced when a brake pad engages a rotor or brake drum. Sensors 79, 79', 79" and 79'" provide the central processing unit 80 with a signal indicative of the vibration at each wheel of the vehicle. Curve trace 90 in FIG. 2 is an illustration of noise produced by a volkswagon II brake during a simulated brake application from 400 rpm with a brake pressure of 300 psi. Spike 92 indicates the development of unacceptable noise that occurred at about 7 KHz. Under such circumstances, the anti-lock system would not be in operation since the noise occurred as a result of the fluid pressure supplied to the wheel cylinders is less than would cause wheel lock on most surfaces. The central processing unit 80 has an internal switch such as a select high that in the absence of an input from the wheel speed sensors 78, 78', 78" and 78'" which allows the vibration signals from sensors 79, 79', 79" and 79'" to be processed. If the vibration is above a predetermined frequency such as 8 Hz, the internal switch allows a signal to be processed in the central processing unit 80 which thereafter sends actuation signals to valves 56, 62 and 68 in the first channel and valves 70, 72 and 74 in the second channel. These actuation signals modulate the fluid pressure in the channels to create a fixed frequency in the fluid pressure supplied to the wheel cylinders 44, 46, 48 and 50. This fixed frequency which will differ for different vehicles is predetermined and could be changed through software modifications in the central processing unit 80, for our test had a frequency of 15 Hz. Curve trace 94 shown in FIG. 3 illustrates the noise experienced during the simulated test of the volkswagon II brake under the same test conditions as shown in FIG. 2 created when the fixed frequency fluid was presented to nullify or modify of the vibrations. In this test, noise was substantially attenuated as the predetermined frequency in the brake fluid cancelled the vibration created during braking. Should the wheel speed sensors 78, 78', 78", and 78'" detect the need for actuation of the anti-lock brake system, the internal switch in the central Processing unit 80 overrides the vibration signal from the vibration sensors 79, 79', 79" and 79'" to allow the anti-lock system to take precedent over the noise attenuating operation of the central processing unit 80. In addition, should the temperature of the friction pad exceed 400 F, the central processing unit also overrides the noise signal to assure that wear experienced by friction pads during a brake application at elevated temperatures is not enhanced.

We claim:

1. For use in an anti-lock braking system which includes a master cylinder, a booster operatively coupled to the master cylinder and having a fluid pressure output and return connected to a single wheel cylinder associated with each wheel in the braking system, a control valve assembly responsive to a first operational input from a central processing unit for modulating fluid pressure to each wheel cylinder in response to a wheel speed condition during a brake application to prevent wheel lock and noise attenuating means, said noise attenuating means comprising:

sensing means associated with each wheel cylinder for providing said central processing unit with a noise input signal corresponding to vibrations created therein during said brake application, said central processing unit responding to said noise input signal by supplying said control valve assembly with a second operational signal for modulating the fluid pressure supplied to each wheel cylinder to create a predetermined fixed frequency in the fluid pressure, said wheel cylinder reacting to said predetermined fixed frequency by modifying said vibrations to substantially reduce the creation of noise caused by said brake application; and means located in said central processing unit response to said wheel speed conditions for overriding said noise input signal to allow said central processing unit to supply said control valve with said first operational signal.

2. The braking system as recited in claim 1 wherein said predetermined fixed frequency can vary from 1-15 KHz.

3. The braking system as recited in claim 1 where said modulating of the fluid by said first and second operational signals produce substantially the same modulations fixed frequency in said fluid pressure supplied to each wheel cylinder.

4. The braking system as recited in claim 1 wherein said means for overriding said noise input signal is a select high switch to assure that the wheel speed condition signal takes president over the noise input signal.

5. The braking system as recited in claim 1 wherein said sensing means further includes:

a temperature sensor for interrupting said noise input signal when the operating temperature of the friction material is above 400° F.

* * * * *